United States Patent [19]

Appel et al.

[11] Patent Number: 4,720,252

[45] Date of Patent: Jan. 19, 1988

[54] SLOTTED MELT-BLOWN DIE HEAD

[75] Inventors: David W. Appel, Wittenberg, Wis.; Adrian D. Drost; Jark C. Lau, both of Roswell, Ga.

[73] Assignee: Kimberly-Clark Corporation, Neenah, Wis.

[21] Appl. No.: 905,228

[22] Filed: Sep. 9, 1986

[51] Int. Cl.[4] .............................................. B28B 5/00
[52] U.S. Cl. .................................. 425/80.1; 425/461; 425/225; 425/72 R; 264/12
[58] Field of Search ................ 264/12, 518; 425/72 S, 425/80.1, 225, 464, 131.5, 72 R, 461

[56] References Cited

U.S. PATENT DOCUMENTS

| | | | |
|---|---|---|---|
| 2,385,358 | 9/1945 | Hanson | 18/54 |
| 3,017,664 | 1/1962 | Ladisch | 18/2.5 |
| 3,072,962 | 1/1963 | McDermott | 18/12 |
| 3,527,859 | 9/1970 | Fairbanks | 264/177 |
| 3,562,369 | 2/1971 | Chopra et al. | 264/41 |
| 3,576,931 | 4/1971 | Chopra et al. | 264/51 |
| 3,751,209 | 8/1973 | Schreiber | 425/461 |
| 3,755,527 | 8/1973 | Keller et al. | 264/518 |
| 3,806,289 | 4/1974 | Schwarz | 425/72 |
| 3,825,380 | 7/1974 | Harding et al. | 425/72 S |
| 3,937,772 | 2/1976 | Urban et al. | 264/12 |
| 3,981,650 | 9/1976 | Page | 425/72 S |
| 4,015,964 | 4/1977 | Levecque | 65/5 |
| 4,047,861 | 9/1977 | Balaz | 425/7 |
| 4,248,579 | 2/1981 | Maejima | 425/227 |
| 4,295,809 | 10/1981 | Mikami et al. | 425/72 S |
| 4,348,349 | 9/1982 | Kurtz | 264/564 |
| 4,389,181 | 6/1983 | Frick | 425/461 |
| 4,468,241 | 8/1984 | Breidenthal | 65/5 |
| 4,485,834 | 12/1984 | Grant | 164/46 |
| 4,526,733 | 7/1975 | Lau | 264/12 |
| 4,533,308 | 8/1985 | Cloeren | 425/131.1 |

OTHER PUBLICATIONS

U.S. Naval Research Laboratory, An Improved Device for the Formation of Superfine, Thermoplastic Fibers, NRL 5265, 02/11/59.
U.S. Naval Research Laboratory, Manufacture of Superfine Organic Fibers, NRL 4364, 04/15/54.

Primary Examiner—Charles Hart
Attorney, Agent, or Firm—William D. Herrick

[57] ABSTRACT

There is disclosed a melt-blowing die head having a die tip which, instead of a number of individual orifices, has a single continuous slot opening running its length. In addition the die tip is reinforced by means of aerodynamically shaped bosses in the fluid delivery channels which bear between the air plate and the exterior surface of the die tip. The die tip may also have reservoirs at either end in which debris may be collected when the slot is cleaned while the die head is in place on a melt-blowing machine.

6 Claims, 11 Drawing Figures

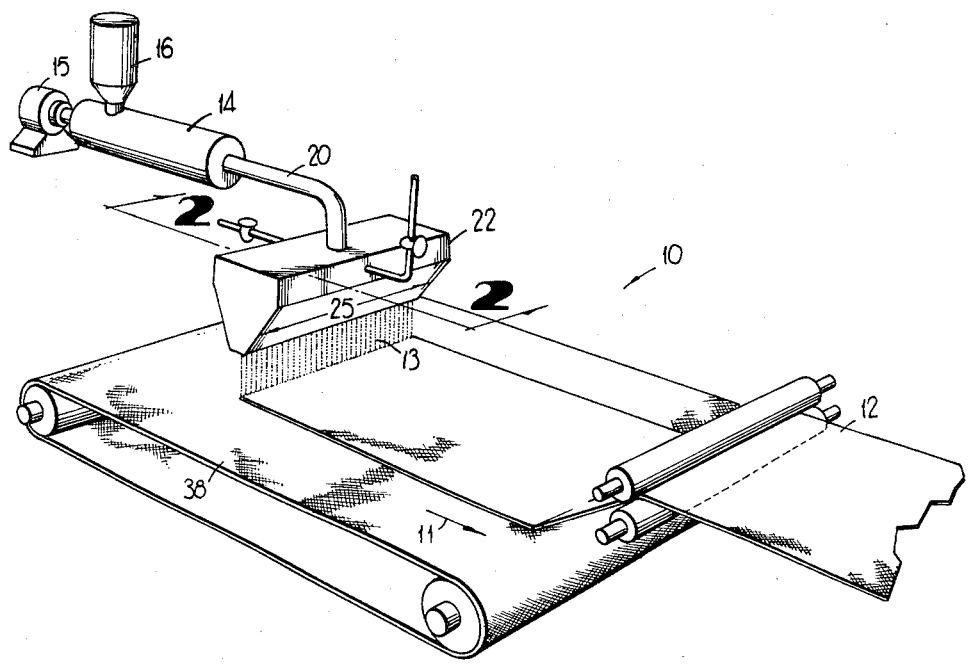
FIG 1
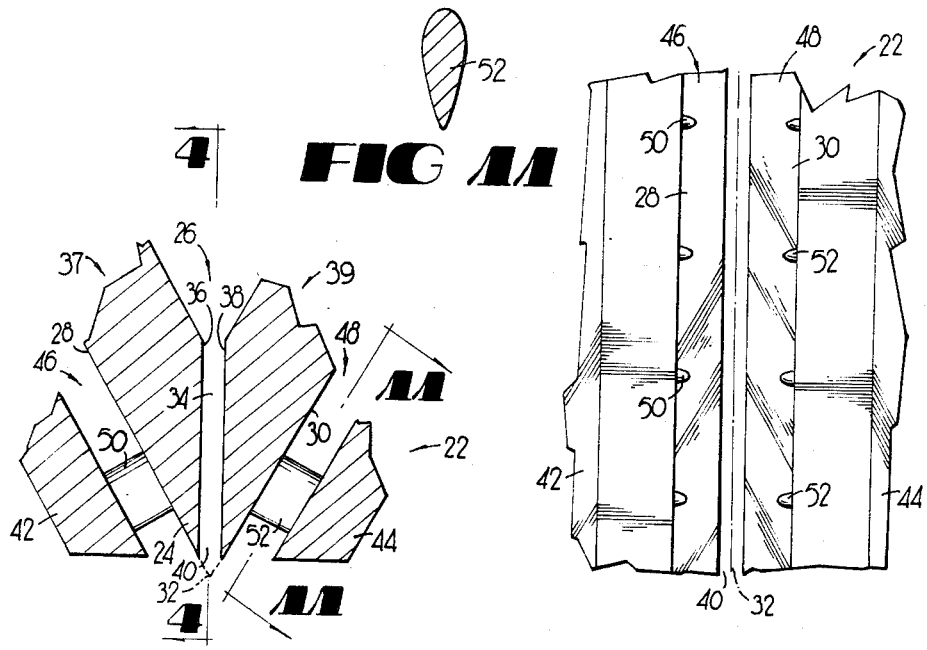
FIG 2
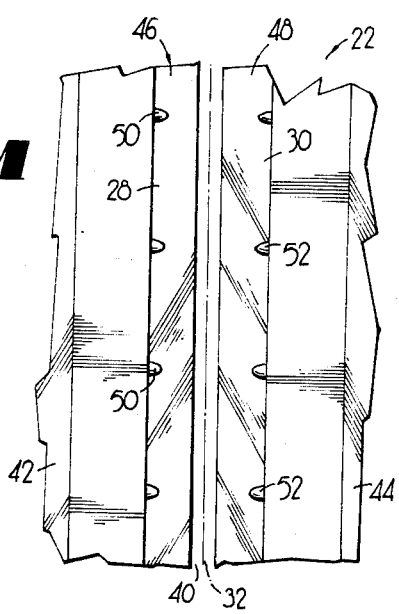
FIG 1A
FIG 3

SLOTTED MELT-BLOWN DIE HEAD

BACKGROUND OF THE INVENTION

This invention relates generally to die heads for producing fibers and nonwoven webs by extruding a melted thermoplastic material into a stream of air, and more particularly concerns a die head having a slot opening extending along the length of the die head instead of individual orifices spaced along the length of the die head.

Forming nonwoven webs by melt-blowing is well-known in the art and is described in various patents and publications, including *Naval Research Laboratory Report No.* 4364, "Manufacture of Super-fine Organic Fibers" by V. A. Wendt, E. L. Boon, and C. D. Fluharty; *Naval Research Laboratory Report No.* 5265, "An Improved Device for the Formation of Super-fine Thermoplastic Fibers" by K. D. Lawrence, R. T. Lukas, and J. A. Young; U.S. Pat. Nos. 3,849,241 to Buntin, et al.; 3,676,242 issued to Prentice; and 3,981,650 issued to Page.

The above references as well as current technology in the area of melt-blowing generally employ an extruder to force a hot melt of thermoplastic material through a row of fine orifices in a die head into converging high-velocity streams of heated gas, usually air, arranged on each side of the extrusion orifices. A conventional die head is disclosed in U.S. Pat. No. 3,825,380 to Harding et al.

As the hot melt exits the orifices, it encounters the high velocity heated gas stream, and the stream of thermoplastic material is attenuated by the gas and broken into discrete fibers which are then deposited on a moving collector surface, usually a foraminous belt, to form a web of the thermoplastic material.

In accordance with conventional practice, the hot melt is extruded through a number of fine individual orifices aligned along the length of the die head. In order to assure the fineness of the fibers, the orifices must be of small diameter. Because of the small diameter of the orifices, it is necessary to provide filter means between the extruder and the small diameter orifices to assure that agglomerated particles, foreign particles, slag, carbon deposits and the like in the polymer melt do not reach the small diameter orifices and plug them. The filters in the die head must be periodically renewed in order to assure that sufficient back pressure is not built up to inhibit the extrusion process. Even when filters are provided in the die head, agglomeration, slag, or carbon deposits may still exist downstream of the filters and prior to the hot melt being extruded through the orifices.

Consequently, the orifices, in spite of all precautions, are subject to becoming plugged. Once the orifices have become plugged, it is necessary to remove the die head from the production line and burn it out in an oven. Such a procedure results in lost production time, high maintenance expenditures, and the necessity for duplicate die heads so that one can be used while the other is being cleaned.

In addition, fabrication of the die head itself with the small diameter orifices represents a significant capital cost due to the expense involved in forming the fine orifices in the die head, by drilling, by electro discharge machining, or by laser drilling.

SUMMARY OF THE INVENTION

It is therefore an object of the present invention to provide a melt-blown die head which has, instead of individual orifices spaced along the length of the die head, a die tip with a slot opening running the length of the die head through which hot melt thermoplastic material is extruded into the converging gas stream.

It is a collateral object of the present invention to provide reservoirs at the ends of the slot opening which, during cleaning of the slot opening, can be used to hold and retain agglomerated or charred particles until such reservoirs can be emptied.

It is also an object of the present invention to provide reinforcing prongs or bosses extending between reinforced air plates on either side of the die tip and the exterior surface of the die tip adjacent the slot opening to reinforce the die tip and assure that the slot opening does not become warped as a result of extrusion pressures.

It is further an object of the present invention to provide a die tip having a slot opening with spaced grooves to assist in the formation and interspersing of large and fine fibers.

It is also an object of the present invention to provide a die tip with a slot opening which has a lip extending from one side of the slot opening into the air stream.

It is likewise an object of the present invention to provide a die tip with a slot opening having a tongue plate extending along the length of the slot opening to divide the slot opening into two separate sections so that two different thermoplastic materials can be extruded simultaneously.

Other objects and advantages of the invention will become apparent upon reading the following detailed description and upon reference to the drawings.

BRIEF DESCRIPTION OF THE DRAWINGS

FIG. 1 is a perspective schematic view of a melt-blown production line which incorporates the slotted die head of the present invention;

FIG. 2 is a fragmentary cross-section view of one embodiment of the slotted die head of the present invention taken along line 2—2 of FIG. 1;

FIG. 3 is a bottom plan view of the slotted die head shown in FIG. 2;

FIG. 11 is a cross-section of a reinforcing prong as seen along line 11—11 of FIG. 2.

DETAILED DESCRIPTION OF THE INVENTION

Figure 4:
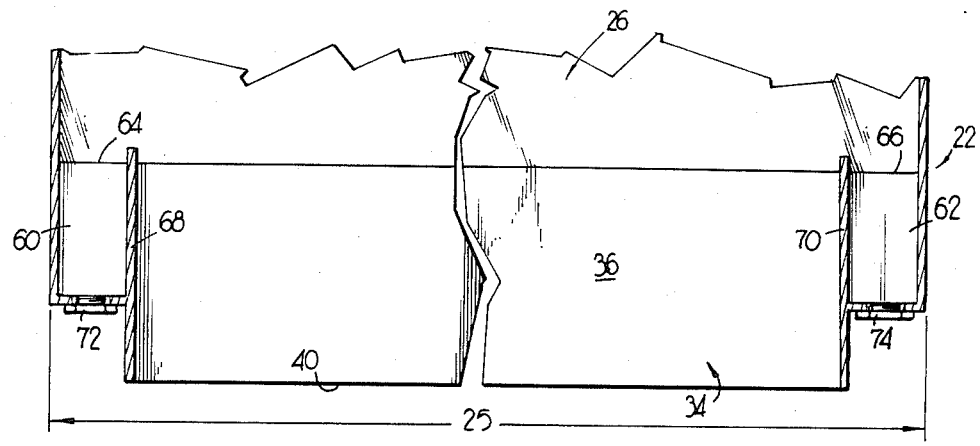
FIG. 4 is a fragmentary section taken along line 4—4 of FIG. 2.

While the invention will be described in connection with a preferred embodiment, it will be understood that we do not intend to limit the invention to that embodiment. On the contrary, we intend to cover all alternatives, modifications, and equivalents as may be included within the spirit and scope of the invention as defined by the appended claims.

Turning to FIG. 1, there is shown a melt-blown production line or machine 10 for forming a melt-blown web 12. The melt-blown machine 10 is conventional in most respects and includes a die head 22 which deposits a layer of melt-blown polymeric microfibers 13 onto a foraminous belt 38 moving in the direction of arrow 11.

The melt-blown machine 10 includes an extruder 14 with a hopper 16 for receiving thermoplastic resin pellets. The extruder 14 may include an internal screw conveyor which is driven by a drive motor 15. The extruder 14 is heated along its length to the melting temperature of the thermoplastic resin pellets so that the resin forms a melt. The screw conveyor, driven by the motor 15, forces the thermoplastic material through the extruder into the delivery pipe 20 which is connected to the die head 22 which has a die length 25.

The die head 22, shown in fragmentary cross-section in FIG. 2, comprises a die tip 24 of generally triangular cross-section having an interior cavity 26 and exterior surfaces 28 and 30. The exterior surfaces 28 and 30 extend downwardly and inwardly toward an imaginary apex 32. The die tip 24 also has a passage 34 having sides 36 and 38 which are generally planar and parallel to each other. The passage 34 also has ends 68 and 70 (FIG. 4) which with sides 36 and 38 define a lower slot opening 40. The passage 34 extends between interior cavity 26 and the slot opening 40 and conducts melted thermoplastic material from the internal cavity to the slot opening. The slot opening 40 extends along the length 25 of the die tip and parallel to the imaginary apex 32 (FIG. 3).

The triangular cross-section provides rigidity to the die tip 24, and the parallel sides 36 and 38 assure a constant pressure within the dimensions of passage 34 so that the tendency of the slot opening to warp as a result of extrusion pressure is reduced.

The die head 22 shown in FIG. 2 also includes air plates 42 and 44 on each side of the exterior surfaces 28 and 30 of the die tip. The air plates 42 and 44 are securely mounted on the die head near the top and extend downwardly toward the apex. The air plates are reinforced to resist outward deflection. The air plates 42 and 44 along with the exterior surfaces 28 and 30 form fluid delivery channels 46 and 48 through which fluid, usually heated air, is delivered adjacent the apex 32 of the die tip to form microfibers from the melted thermoplastic material as it is extruded from slot opening 40.

Within the channels 46 and 48 are a number of reinforcing bosses such as 50 and 52 which extend between the reinforced air plates 42 and 44 and the exterior surfaces 28 and 30 respectively to reinforce the die tip 24. The bosses have an aerodynamic cross-section, as shown in FIG. 11, so that they do not create undue turbulence in the air flow. There are a number of bosses such as 50 and 52 spaced along the length 25 of the die tip (FIG. 3). The reinforcing bosses provide additional lateral support on either side of the opening 40 of the die tip to assure that the slot opening 40 is not warped as a result of extrusion pressures as the hot melt is forced from the internal cavity 26 through the passage 34 and subsequently out of the slot opening 40.

Alternatively, the sides of the die tip 24 can be designed to provide predictable lateral deflection to extrusion pressure and thereby obviate the need for the reinforcing bosses. In order to provide a deflectable die tip, end walls 68 and 70 have lateral slide guides in order to accommodate the deflection of the die tip so that the slot will remain uniform in width along the length of the die tip as the sides of the die tip deflect.

Slotted die head 22 with its slot opening 40 in the die tip 24 provides substantial advantages over the prior art die heads which have individual orifices aligned along the apex of the die tip. First, the slot is able to pass elongated agglomerated particles which would necessarily stick in a round single orifice. Second, even if agglomerated particles become entrapped in the passage 34 at some point along the length 25 of the die tip 24, the flow of the polymer melt on either side of the obstruction tends to erode the obstruction and may ultimately be able to clear the obstruction without interrupting the process. Third, even if the passage 34 and slot opening 40 become plugged, the passage 34 and slot opening 40 may be unplugged by simply inserting a metal shim into the slot opening 40 and passage 34 and clearing the agglomerated or charred material from the passage 34 and slot opening 40 without removing the die from the machine. Finally, the cost of manufacturing the slotted die head is less than a die head with individual orifices. The die head 22 is divided in two halves 37 and 39 along the center of passage 34. The side surfaces 36 and 38 are machined flat and smooth on each half, and the halves 37 and 39 are bolted together with shims to establish the desired width of the slot opening 40. The surface machining of surfaces 36 and 38 is more accurate and less expensive than producing individual orifices.

Turning to FIG. 4, there is shown a cross-sectional view of the die head 22 of FIG. 2 showing the interior cavity 26 as well as the side 36 of the passage 34. Reservoirs 60 and 62 are provided at either end of the die head 22. Reservoirs 60 and 62 have a top openings 64 and 66 respectively and are separated from the passage 34 by means of end walls 68 and 70.

While the die head 22 with its slot opening 40 is particularly advantageous because of its resistance to plugging, reservoirs 60 and 62 facilitate cleaning if the die tip becomes plugged. As previously stated, the slot may be cleared by simply inserting a metal shim into the slot opening 40 and passage 34 and running the shim along the length of the slot opening 40. As debris is pushed out of the passage 34 into the cavity 26, it may be worked toward the ends of the die head 22 and forced into the openings 64 and 66 of the reservoirs 60 and 62. The debris settles to the bottom of the reservoirs 60 and 62 and is collected there. At regular intervals after use of the shim to clear the slot opening, the bottom openings 72 and 74 can be opened to allow the debris to be drained off and collected to be discarded. Once the debris settles into the reservoirs, it cannot easily find its way back to the slot opening 40. Cleaning can thus be accomplished without removing the die tip. If the debris in the reservoirs is sufficient to plug the bottom openings 72 and 74, the openings can be opened for drainage by running a ramrod into the opening.

Figure 5:
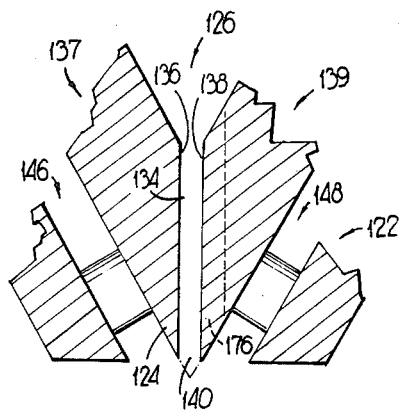
FIG. 5 is a fragmentary cross-section view (similar to FIG. 2) of a second embodiment of the slotted die head of the present invention.
Figure 6:
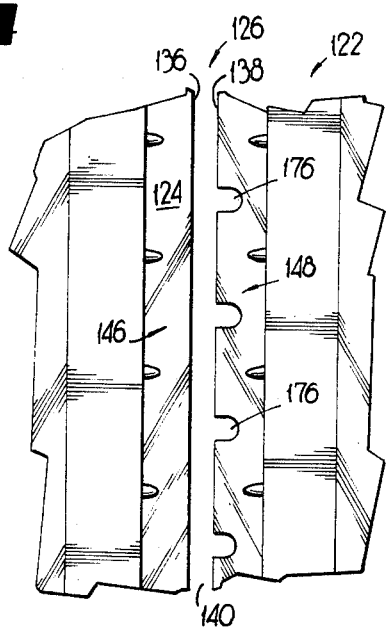
FIG. 6 is a bottom plan view of the slotted die head shown in FIG. 5.

Turning to FIGS. 5 and 6, there is shown a die head 122 which is a second embodiment of the present invention. The die head 122 is in all respects the same as die head 22 of FIGS. 2 and 3 except for the configuration of passage 134 which has grooves 176 cut in side 138 of planar, parallel sides 136 and 138. The grooves 176 are cut in surface 138 (FIG. 6) before the die head halves 137 and 139 are bolted together. The grooves 176 extend between the opening 140 and the interior cavity 126. The grooves 176 may be of any desired cross-sectional configuration such as round, oblong, oval, square, rectangular, triangular, or any other desired shape. As can be seen from FIG. 6, as thermoplastic material is extruded through passage 134, the thermoplastic material fills the grooves 176. As the thermoplastic material exits the slot opening 140, the thermoplastic sheet has alternate thickened sections relating to the positions of the grooves 176 on sidewall 138. As the corrugated-like sheet of thermoplastic material enters the air stream, the air delivered through channels 146 and 148 produces microfibers of generally two sizes, fibers of larger diameter size resulting from the thermoplastic material extruded from the grooves 176 and fibers of smaller diameter size extruded from the slot where the grooves are not present. Consequently, the resulting web has both fine and coarse fibers.

Figure 7:
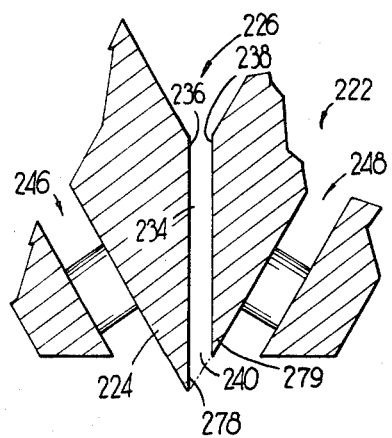
FIG. 7 is a fragmentary cross-section view (similar to FIG. 2) of a third embodiment of the slotted die head of the present invention.
Figure 8:
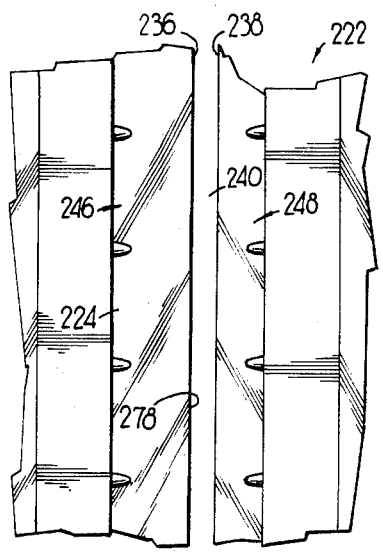
FIG. 8 is a bottom plan view of the slotted die head shown in FIG. 7.

Turning to FIGS. 7 and 8, there is shown a die head 222 which is a third embodiment of the present invention. The die head 222 and die tip 224 are similar to die head 22 and die tip 24 of FIG. 2 in all respects except that the die tip 224 has a lip 278 which is an extension of planar, parallel side 236 of the die tip 224. The lip 278 extends beyond the usual position and beyond lip 279 of the die tip 224. As thermoplastic material in interior cavity 226 is extruded through passage 234 and through opening 240, thermoplastic material remains in contact with side 236 which forms part of lip 278 even after the thermoplastic material exits the slot opening 240. As a result, air supplied through channel 248 presses the thermoplastic material against planar side surface 236 of lip 278 which assists in the attenuation and break-up of the thermoplastic material into very fine fibers. Air supplied through passage 246 on the opposite side of planar side surface 236 of lip 278 simply serves to further break up and mix the fibers after they have been stripped from the side surface 236 of lip 278 by the air from passage 248.

Figure 9:
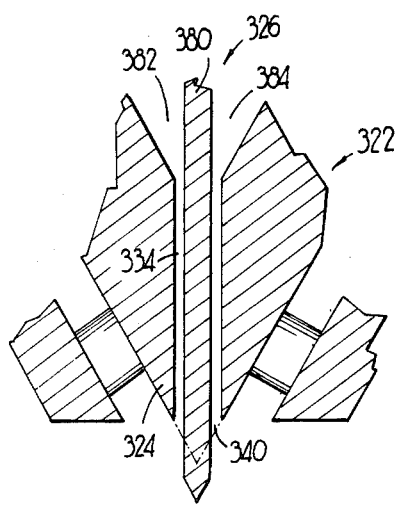
FIG. 9 is a fragmentary cross-section view (similar to FIG. 2) of a fourth embodiment of the slotted die head of the present invention.
Figure 10:
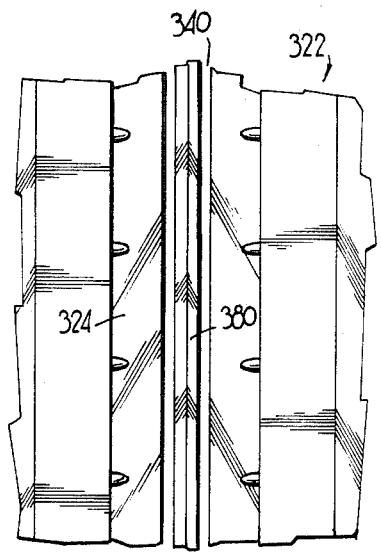
FIG. 10 is a bottom plan view of the slotted die head shown in FIG. 9.

Turning to FIGS. 9 and 10, there is shown a die head 322 which is a fourth embodiment of the present invention. The die head 322 is similar to die head 22 of FIG. 2 except that internal cavity 326 and passage 334 are divided into two sections 382 and 384 having planar parallel sides by means of a tongue plate 380. The tongue plate 380 may either have a tapered lower end as shown or a blunt end. Consequently, two separate thermoplastic materials can be extruded simultaneously. One thermoplastic material is extruded through section 382 and the other through section 384.

In order to assess the performance of the die head of the present invention, the die head 22 shown in FIGS. 2 and 3 was used to make melt-blown webs in accordance with the following examples:

EXAMPLE 1

Polymer: Polypropylene
Polymer Temperature: 605° F.
Polymer Slot Opening: 0.007 inch
Throughput: 3.04 PIH
Die Stick Out 0 inch
Fluid Air Temperature: 400° F.
Air Gap: 0.020 inch
Air Pressure: 15 psig Fibers were quenched with water spray. Web was found to be soft and to consist of fibers with average sizes in the range of 2 micrometers in diameter.

EXAMPLE 2

Polymer: Polypropylene
Polymer Temperature: 600° F.
Polymer Slot Opening: 0.007 inch
Throughput: 5.03 PIH
Die Stick Out 0 inch
Fluid (Air) Temperature: 615° F.
Air Gap: 0.020 inch
Air Pressure: 15 psig The web was very soft. Average size of fiber was approximately 1.4 micrometers in diameter.

EXAMPLE 3

Polymer: Polypropylene
Polymer Temperature: 550° F.
Polymer Slot Opening: 0.007 inch
Throughput: 6.7 PIH
Die Stick Out −0.005 inch
Air Temperature: 600° F.
Air Gap: 0.020 inch
Air Pressure: 15 psig The samples were soft, but not as smooth as Examples 1 and 2.

The polypropylene resin in the examples did not include a prodegradant. The "Polymer Slot Opening" corresponds to slot opening 40 in FIGS. 2 and 3. The unit for throughput, "PIH", is pounds of polymer per inch of die tip length per hour. The "Die Stick Out" is the distance the lower end of the die tip 24 extends below the air plates 42 and 44. In FIG. 2, the "Die Stick Out" is illustrated to be 0 inch. The air gap is the width of the air channels 46 and 48.

We claim:

1. In an elongated die head for extruding melted thermoplastic material to form fibers, wherein the die head has an elongated centrally located die tip, which die tip extends along the length of the die head, has a hollow interior cavity for receiving melted thermoplastic material, and has external surfaces defining a generally triangular cross-section and extending toward an apex, which apex defines a line extending the length of the die head, and wherein the die head also has air plates mounted on both sides of the die tip which air plates along with the exterior surfaces of the die tip define fluid delivery channels on both sides of the die tip which fluid delivery channels extend parallel to the apex and deliver a fluid stream adjacent the die tip, the improvement comprising a passage having sides which are generally planar and parallel to each other and which extend parallel to the line of the apex and wherein the passage also has ends which with the sides define a continuous slot opening extending along the apex and wherein the passage communicates with the hollow interior cavity for delivering melted thermoplastic material through the slot opening into the fluid stream.

2. The die head of claim 1, wherein the ends of the passage include reservoirs with top openings for receiving debris during cleaning and bottom openings for periodically draining such debris.

3. The die head of claim 1, wherein bosses of aerodynamic profile are interposed in the fluid channels and bear between the air plate and the exterior surface of the die tip to reinforce the die tip and assure the slot opening remains essentially dimensionally unchanged during extrusion.

4. The die head of claim 1 or 3, wherein at least one of the sides has spaced grooves which extend from the slot opening toward the hollow interior cavity and perpendicular to the line of the apex.

5. The die head of claim 1 or 3, wherein at least one of the sides extends below the other side to form a lip within the fluid stream.

6. The die head of claim 1 or 3, wherein a tongue plate extends through the interior cavity and through the passage, parallel to the sides of the passage to divide the interior cavity and passage into two separate sections.

* * * * *